United States Patent
D'Souza et al.

(10) Patent No.: US 8,190,151 B2
(45) Date of Patent: *May 29, 2012

(54) ROAMING GATEWAY ENABLING LOCATION BASED SERVICES (LBS) ROAMING FOR USER PLANE IN CDMA NETWORKS WITHOUT REQUIRING USE OF A MOBILE POSITIONING CENTER (MPC)

(75) Inventors: Myron D'Souza, Seattle, WA (US); Gordon John Hines, Kirkland, WA (US); David Bartnik, Bothell, WA (US); Joseph Hannan, Snoqualmie, WA (US); Joel Groen, Seattle, WA (US); William Wells, Federal Way, WA (US)

(73) Assignee: TeleCommunication Systems, Inc., Annapolis, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/067,205

(22) Filed: May 17, 2011

(65) Prior Publication Data
US 2011/0223909 A1 Sep. 15, 2011

Related U.S. Application Data

(63) Continuation of application No. 11/979,493, filed on Nov. 5, 2007, now Pat. No. 7,966,013.

(60) Provisional application No. 60/856,285, filed on Nov. 3, 2006.

(51) Int. Cl.
*H04W 4/00* (2009.01)

(52) U.S. Cl. .................. 455/432.1; 455/433; 455/435.1; 455/456.1; 455/456.2; 455/456.3; 455/456.5; 455/456.6; 455/457; 370/310.2; 370/328

(58) Field of Classification Search ............... 455/431.1, 455/433, 456.1–457, 432.1; 370/310.2, 328
See application file for complete search history.

(56) References Cited

U.S. PATENT DOCUMENTS 1,103,073 A 7/1914 O'Connell
(Continued)

FOREIGN PATENT DOCUMENTS

WO PCT/SE98/01887 10/1998
(Continued)

OTHER PUBLICATIONS

Intrado Inc., Qwest Detailed SR/ALI to MPC/GMLC Interface Specification for TCP/IP Implementation of TIA/EIA/J-STD-036 E2 with Phase I Location Description Addition, Intrado Informed Response; Apr. 2004; Issue 1.11; pp. 1-57.

(Continued)

*Primary Examiner* — Steve D Agosta
(74) *Attorney, Agent, or Firm* — William H. Bollman

(57) ABSTRACT

LBS support to CDMA mobiles while roaming on another network. IS-801 session data is routed by a routing gateway to a correct visited network PDE that contains correct BSA data, which is used to return assistance data to an interrogating mobile device. A standalone exemplary roaming LBS routing gateway (XRG) provides network connectivity between PDE equipment in multiple carrier networks. Conventional LBS roaming support is defined via the use of Mobile Position Centers (MPCs). The invention implements a roaming LBS gateway to enable roaming between CDMA carriers that are only using a PDE (Positioning Determining Entity) for this purpose, since a mobile position center (MPC) is typically an optional network node according to location based services (LBS) specifications.

7 Claims, 4 Drawing Sheets

U.S. PATENT DOCUMENTS

| | | |
|---|---|---|
| 4,445,118 A | 4/1984 | Taylor et al. |
| 4,494,119 A | 1/1985 | Wimbush |
| 4,651,156 A | 3/1987 | Martinez |
| 4,706,275 A | 11/1987 | Kamil |
| 4,868,570 A | 9/1989 | Davis |
| 4,891,638 A | 1/1990 | Davis |
| 4,891,650 A | 1/1990 | Sheffer |
| 4,910,767 A | 3/1990 | Brugliera et al. |
| 4,952,928 A | 8/1990 | Carroll |
| 4,972,484 A | 11/1990 | Theile |
| 5,014,206 A | 5/1991 | Scribner |
| 5,043,736 A | 8/1991 | Darnell |
| 5,055,851 A | 10/1991 | Sheffer |
| 5,068,656 A | 11/1991 | Sutherland |
| 5,068,891 A | 11/1991 | Marshall |
| 5,070,329 A | 12/1991 | Jasimaki |
| 5,081,667 A | 1/1992 | Drori |
| 5,119,104 A | 6/1992 | Heller |
| 5,126,722 A | 6/1992 | Kamis |
| 5,144,283 A | 9/1992 | Arens |
| 5,161,180 A | 11/1992 | Chavous |
| 5,166,972 A | 11/1992 | Smith |
| 5,177,478 A | 1/1993 | Wagai |
| 5,193,215 A | 3/1993 | Olmer |
| 5,208,756 A | 5/1993 | Song |
| 5,214,789 A | 5/1993 | George |
| 5,218,367 A | 6/1993 | Sheffer |
| 5,223,844 A | 6/1993 | Mansell |
| 5,239,570 A | 8/1993 | Koster |
| 5,265,630 A | 11/1993 | Hartmann |
| 5,266,944 A | 11/1993 | Carroll |
| 5,283,570 A | 2/1994 | DeLuca |
| 5,289,527 A | 2/1994 | Tiedemann |
| 5,293,642 A | 3/1994 | Lo |
| 5,299,132 A | 3/1994 | Wortham |
| 5,301,354 A | 4/1994 | Schwendeman |
| 5,311,516 A | 5/1994 | Kuznicke |
| 5,325,302 A | 6/1994 | Izidon |
| 5,327,529 A | 7/1994 | Fults |
| 5,334,974 A | 8/1994 | Simms |
| 5,335,246 A | 8/1994 | Yokev |
| 5,343,493 A | 8/1994 | Karimulah |
| 5,347,568 A | 9/1994 | Moody |
| 5,351,235 A | 9/1994 | Lahtinen |
| 5,361,212 A | 11/1994 | Class |
| 5,363,425 A | 11/1994 | Mufti |
| 5,365,451 A | 11/1994 | Wang |
| 5,374,936 A | 12/1994 | Feng |
| 5,379,451 A | 1/1995 | Nakagoshi |
| 5,381,338 A | 1/1995 | Wysocki |
| 5,387,993 A | 2/1995 | Heller |
| 5,388,147 A | 2/1995 | Grimes |
| 5,390,339 A | 2/1995 | Bruckery |
| 5,394,158 A | 2/1995 | Chia |
| 5,396,227 A | 3/1995 | Carroll |
| 5,398,190 A | 3/1995 | Wortham |
| 5,406,614 A | 4/1995 | Hara |
| 5,418,537 A | 5/1995 | Bird |
| 5,422,813 A | 6/1995 | Schuchman |
| 5,423,076 A | 6/1995 | Westergren |
| 5,432,841 A | 7/1995 | Rimer |
| 5,434,789 A | 7/1995 | Fraker |
| 5,454,024 A | 9/1995 | Lebowitz |
| 5,461,390 A | 10/1995 | Hosher |
| 5,470,233 A | 11/1995 | Fruchterman |
| 5,479,408 A | 12/1995 | Will |
| 5,479,482 A | 12/1995 | Grimes |
| 5,485,161 A | 1/1996 | Vaugh |
| 5,485,163 A | 1/1996 | Singer |
| 5,488,563 A | 1/1996 | Chazelle |
| 5,494,091 A | 2/1996 | Freeman |
| 5,497,149 A | 3/1996 | Fast |
| 5,506,886 A | 4/1996 | Maine |
| 5,508,931 A | 4/1996 | Snider |
| 5,513,243 A | 4/1996 | Kage |
| 5,515,287 A | 5/1996 | Hakoyama |
| 5,517,199 A | 5/1996 | DiMattei |
| 5,519,403 A | 5/1996 | Bickley |
| 5,530,655 A | 6/1996 | Lokhoff |
| 5,530,914 A | 6/1996 | McPheters |
| 5,532,690 A | 7/1996 | Hertel |
| 5,535,434 A | 7/1996 | Siddoway |
| 5,539,395 A | 7/1996 | Buss |
| 5,539,398 A | 7/1996 | Hall |
| 5,539,829 A | 7/1996 | Lokhoff |
| 5,543,776 A | 8/1996 | L'Esperance |
| 5,546,445 A | 8/1996 | Dennison |
| 5,552,772 A | 9/1996 | Janky |
| 5,555,286 A | 9/1996 | Tendler |
| 5,568,119 A | 10/1996 | Schipper |
| 5,568,153 A | 10/1996 | Beliveau |
| 5,574,648 A | 11/1996 | Pilley |
| 5,579,372 A | 11/1996 | Angstrom |
| 5,588,009 A | 12/1996 | Will |
| 5,592,535 A | 1/1997 | Klotz |
| 5,594,780 A | 1/1997 | Wiedeman |
| 5,604,486 A | 2/1997 | Lauro |
| 5,606,313 A | 2/1997 | Allen |
| 5,606,618 A | 2/1997 | Lokhoff |
| 5,606,850 A | 3/1997 | Nakamura |
| 5,610,815 A | 3/1997 | Gudat |
| 5,614,890 A | 3/1997 | Fox |
| 5,615,116 A | 3/1997 | Gudat |
| 5,621,793 A | 4/1997 | Bednarek |
| 5,628,051 A | 5/1997 | Salin |
| 5,629,693 A | 5/1997 | Janky |
| 5,633,912 A | 5/1997 | Tsoi |
| 5,636,276 A | 6/1997 | Brugger |
| 5,661,652 A | 8/1997 | Sprague |
| 5,661,755 A | 8/1997 | Van de Kerkhof |
| 5,682,600 A | 10/1997 | Salin |
| 5,689,245 A | 11/1997 | Noreen |
| 5,699,053 A | 12/1997 | Jonsson |
| 5,704,029 A | 12/1997 | Wright, Jr. |
| 5,721,781 A | 2/1998 | Deo |
| 5,731,785 A | 3/1998 | Lemelson |
| 5,740,534 A | 4/1998 | Ayerst |
| 5,761,618 A | 6/1998 | Lynch |
| 5,765,152 A | 6/1998 | Erickson |
| 5,767,795 A | 6/1998 | Schaphorst |
| 5,768,509 A | 6/1998 | Gunluk |
| 5,771,353 A | 6/1998 | Eggleston |
| 5,774,533 A | 6/1998 | Patel |
| 5,774,670 A | 6/1998 | Montulli |
| 5,787,357 A | 7/1998 | Salin |
| 5,794,142 A | 8/1998 | Vantilla |
| 5,797,094 A | 8/1998 | Houde |
| 5,797,096 A | 8/1998 | Lupien |
| 5,802,492 A | 9/1998 | DeLorrme |
| 5,806,000 A | 9/1998 | Vo |
| 5,809,415 A | 9/1998 | Rossmann |
| 5,812,086 A | 9/1998 | Bertiger |
| 5,812,087 A | 9/1998 | Krasner |
| 5,822,700 A | 10/1998 | Hult |
| 5,828,740 A | 10/1998 | Khue |
| 5,835,907 A | 11/1998 | Newman |
| 5,841,396 A | 11/1998 | Krasner |
| 5,857,201 A | 1/1999 | Wright, Jr. |
| 5,864,667 A | 1/1999 | Barkam |
| 5,874,914 A | 2/1999 | Krasner |
| 5,896,369 A | 4/1999 | Warsta |
| 5,920,821 A | 7/1999 | Seaholtz |
| 5,922,074 A | 7/1999 | Richard |
| 5,930,250 A | 7/1999 | Klok |
| 5,930,701 A | 7/1999 | Skog |
| 5,943,399 A | 8/1999 | Bannister |
| 5,945,944 A | 8/1999 | Krasner |
| 5,946,629 A | 8/1999 | Sawyer |
| 5,946,630 A | 8/1999 | Willars |
| 5,950,130 A | 9/1999 | Coursey |
| 5,950,137 A | 9/1999 | Kim |
| 5,953,398 A | 9/1999 | Hill |
| 5,960,362 A | 9/1999 | Grob |
| 5,974,054 A | 10/1999 | Couts |
| 5,978,685 A | 11/1999 | Laiho |
| 5,983,099 A | 11/1999 | Yao |
| 5,987,323 A | 11/1999 | Huotari |

| | | |
|---|---|---|
| 5,998,111 A | 12/1999 | Abe |
| 5,999,124 A | 12/1999 | Sheynblat |
| 6,014,602 A | 1/2000 | Kithol |
| 6,032,051 A | 2/2000 | Hall |
| 6,035,025 A | 3/2000 | Hanson |
| 6,049,710 A | 4/2000 | Nilsson |
| 6,052,081 A | 4/2000 | Krasner |
| 6,058,300 A | 5/2000 | Hanson |
| 6,058,338 A | 5/2000 | Agashe et al. |
| 6,061,018 A | 5/2000 | Sheynblat |
| 6,061,346 A | 5/2000 | Nordman |
| 6,064,336 A | 5/2000 | Krasner |
| 6,064,875 A | 5/2000 | Morgan |
| 6,067,045 A | 5/2000 | Castelloe |
| 6,070,067 A | 5/2000 | Nguyen |
| 6,075,982 A | 6/2000 | Donovan |
| 6,081,229 A | 6/2000 | Soliman |
| 6,081,508 A | 6/2000 | West |
| 6,085,320 A | 7/2000 | Kaliski, Jr. |
| 6,101,378 A | 8/2000 | Barabush |
| 6,104,931 A | 8/2000 | Havinis |
| 6,108,533 A | 8/2000 | Brohoff |
| 6,122,503 A | 9/2000 | Daly |
| 6,122,520 A | 9/2000 | Want |
| 6,124,810 A | 9/2000 | Segal |
| 6,131,028 A | 10/2000 | Whitington |
| 6,131,067 A | 10/2000 | Girerd |
| 6,133,874 A | 10/2000 | Krasner |
| 6,134,316 A * | 10/2000 | Kallioniemi et al. .... 379/220.01 |
| 6,134,483 A | 10/2000 | Vayanos |
| 6,138,003 A | 10/2000 | Kingdon |
| 6,148,197 A | 11/2000 | Bridges |
| 6,148,198 A | 11/2000 | Anderson |
| 6,149,353 A | 11/2000 | Nilsson |
| 6,150,980 A | 11/2000 | Krasner |
| 6,154,172 A | 11/2000 | Piccionelli |
| 6,169,891 B1 | 1/2001 | Gorham |
| 6,169,901 B1 | 1/2001 | Boucher |
| 6,169,902 B1 | 1/2001 | Kawamoto |
| 6,173,181 B1 | 1/2001 | Losh |
| 6,178,505 B1 | 1/2001 | Schneider |
| 6,178,506 B1 | 1/2001 | Quick, Jr. |
| 6,181,935 B1 | 1/2001 | Gossman |
| 6,181,939 B1 | 1/2001 | Ahvenainen |
| 6,188,354 B1 | 2/2001 | Soliman |
| 6,188,752 B1 | 2/2001 | Lesley |
| 6,188,909 B1 | 2/2001 | Alananra |
| 6,189,098 B1 | 2/2001 | Kaliski, Jr. |
| 6,195,557 B1 | 2/2001 | Havinis |
| 6,198,431 B1 | 3/2001 | Gibson |
| 6,199,045 B1 | 3/2001 | Giniger |
| 6,199,113 B1 | 3/2001 | Alegre |
| 6,205,330 B1 | 3/2001 | Winbladh |
| 6,208,290 B1 | 3/2001 | Krasner |
| 6,208,854 B1 | 3/2001 | Roberts |
| 6,215,441 B1 | 4/2001 | Moeglein |
| 6,219,557 B1 | 4/2001 | Havinis |
| 6,223,046 B1 | 4/2001 | Hamill-Keays |
| 6,226,529 B1 | 5/2001 | Bruno |
| 6,239,742 B1 | 5/2001 | Krasner |
| 6,247,135 B1 | 6/2001 | Feaugue |
| 6,249,680 B1 | 6/2001 | Wax |
| 6,249,744 B1 | 6/2001 | Morita |
| 6,249,873 B1 | 6/2001 | Richard |
| 6,253,074 B1 | 6/2001 | Carlsson |
| 6,253,203 B1 | 6/2001 | O'Flaherty |
| 6,260,147 B1 | 7/2001 | Quick, Jr. |
| 6,266,614 B1 | 7/2001 | Alumbaugh |
| 6,275,692 B1 | 8/2001 | Skog |
| 6,275,849 B1 | 8/2001 | Ludwig |
| 6,278,701 B1 | 8/2001 | Ayyagari |
| 6,289,373 B1 | 9/2001 | Dezonno |
| 6,297,768 B1 | 10/2001 | Allen, Jr. |
| 6,307,504 B1 | 10/2001 | Sheynblat |
| 6,308,269 B2 | 10/2001 | Proidl |
| 6,313,786 B1 | 11/2001 | Sheynblat |
| 6,317,594 B1 | 11/2001 | Gossman |
| 6,321,091 B1 | 11/2001 | Holland |
| 6,321,092 B1 | 11/2001 | Fitch |
| 6,321,257 B1 | 11/2001 | Kotola |
| 6,324,542 B1 | 11/2001 | Wright, Jr. et al. |
| 6,327,473 B1 | 12/2001 | Soliman |
| 6,327,479 B1 | 12/2001 | Mikkola |
| 6,330,454 B1 | 12/2001 | Verdonk |
| 6,333,919 B2 | 12/2001 | Gaffney |
| 6,360,093 B1 | 3/2002 | Ross |
| 6,360,102 B1 | 3/2002 | Havinis |
| 6,363,254 B1 | 3/2002 | Jones |
| 6,367,019 B1 | 4/2002 | Ansell |
| 6,370,389 B1 | 4/2002 | Isomursu |
| 6,377,209 B1 | 4/2002 | Krasner |
| 6,400,314 B1 | 6/2002 | Krasner |
| 6,400,958 B1 | 6/2002 | Isomursu |
| 6,411,254 B1 | 6/2002 | Moeglein |
| 6,421,002 B2 | 7/2002 | Krasner |
| 6,427,001 B1 | 7/2002 | Contractor |
| 6,433,734 B1 | 8/2002 | Krasner |
| 6,434,381 B1 | 8/2002 | Moore |
| 6,442,391 B1 | 8/2002 | Johansson |
| 6,449,473 B1 | 9/2002 | Raivisto |
| 6,449,476 B1 | 9/2002 | Hutchison, IV |
| 6,456,852 B2 | 9/2002 | Bar |
| 6,463,272 B1 | 10/2002 | Wallace |
| 6,477,150 B1 | 11/2002 | Maggenti |
| 6,504,491 B1 | 1/2003 | Christians |
| 6,505,049 B1 | 1/2003 | Dorenbosch |
| 6,510,387 B2 | 1/2003 | Fuchs |
| 6,512,922 B1 | 1/2003 | Burg |
| 6,512,930 B2 | 1/2003 | Sandegren |
| 6,515,623 B2 | 2/2003 | Johnson |
| 6,519,466 B2 | 2/2003 | Pande |
| 6,522,682 B1 | 2/2003 | Kohli |
| 6,526,026 B1 | 2/2003 | Menon |
| 6,529,500 B1 | 3/2003 | Pandharipande |
| 6,529,829 B2 | 3/2003 | Turetzky |
| 6,531,982 B1 | 3/2003 | White |
| 6,538,757 B1 | 3/2003 | Sansone |
| 6,539,200 B1 | 3/2003 | Schiff |
| 6,539,232 B2 | 3/2003 | Hendrey et al. |
| 6,539,304 B1 | 3/2003 | Chansarkar |
| 6,542,464 B1 | 4/2003 | Takeda |
| 6,542,734 B1 | 4/2003 | Abrol |
| 6,542,743 B1 | 4/2003 | Soliman |
| 6,549,776 B1 | 4/2003 | Joong |
| 6,549,844 B1 | 4/2003 | Egberts |
| 6,553,236 B1 | 4/2003 | Dunko |
| 6,556,832 B1 | 4/2003 | Soliman |
| 6,560,456 B1 | 5/2003 | Lohtia |
| 6,560,461 B1 | 5/2003 | Fomukong |
| 6,560,534 B2 | 5/2003 | Abraham |
| 6,564,261 B1 | 5/2003 | Gudjonsson |
| 6,570,530 B2 | 5/2003 | Gaal |
| 6,571,095 B1 | 5/2003 | Koodli |
| 6,574,558 B2 | 6/2003 | Kohli |
| 6,580,390 B1 | 6/2003 | Hay |
| 6,584,552 B1 | 6/2003 | Kuno |
| 6,587,691 B1 | 7/2003 | Granstam |
| 6,594,500 B2 | 7/2003 | Bender |
| 6,597,311 B2 | 7/2003 | Sheynblat |
| 6,600,927 B2 | 7/2003 | Hamilton |
| 6,603,973 B1 | 8/2003 | Foladare |
| 6,606,495 B1 | 8/2003 | Korpi |
| 6,606,554 B2 | 8/2003 | Edge |
| 6,609,004 B1 | 8/2003 | Morse |
| 6,611,757 B2 | 8/2003 | Brodie |
| 6,618,593 B1 | 9/2003 | Drutman |
| 6,618,670 B1 | 9/2003 | Chansarkar |
| 6,621,452 B2 | 9/2003 | Knockeart |
| 6,621,810 B1 | 9/2003 | Leung |
| 6,628,233 B2 | 9/2003 | Knockeart |
| 6,633,255 B2 | 10/2003 | Krasner |
| 6,640,184 B1 | 10/2003 | Rabe |
| 6,650,288 B1 | 11/2003 | Pitt |
| 6,661,372 B1 | 12/2003 | Girerd |
| 6,665,539 B2 | 12/2003 | Sih |
| 6,665,541 B1 | 12/2003 | Krasner |
| 6,671,620 B1 | 12/2003 | Garin |
| 6,677,894 B2 | 1/2004 | Sheynblat |

| | | |
|---|---|---|
| 6,680,694 B1 | 1/2004 | Knockheart |
| 6,680,695 B2 | 1/2004 | Turetzky |
| 6,687,504 B1 | 2/2004 | Raith |
| 6,691,019 B2 | 2/2004 | Seeley |
| 6,694,258 B2 | 2/2004 | Johnson |
| 6,697,629 B1 | 2/2004 | Grilli |
| 6,698,195 B1 | 3/2004 | Hellinger |
| 6,701,144 B2 | 3/2004 | Kirbas |
| 6,703,971 B2 | 3/2004 | Pande |
| 6,703,972 B2 | 3/2004 | Van Diggelen |
| 6,704,651 B2 | 3/2004 | Van Diggelen |
| 6,707,421 B1 | 3/2004 | Drury |
| 6,714,793 B1 | 3/2004 | Carey |
| 6,718,174 B2 | 4/2004 | Vayanos |
| 6,720,915 B2 | 4/2004 | Sheynblat |
| 6,721,578 B2 | 4/2004 | Minear |
| 6,721,871 B2 | 4/2004 | Piispanen |
| 6,724,342 B2 | 4/2004 | Bloebaum |
| 6,725,159 B2 | 4/2004 | Krasner |
| 6,728,701 B1 | 4/2004 | Stoica |
| 6,731,940 B1 | 5/2004 | Nagendran |
| 6,734,821 B2 | 5/2004 | Van Diggelen |
| 6,738,013 B2 | 5/2004 | Orler |
| 6,738,800 B1 | 5/2004 | Aquilon |
| 6,741,842 B2 | 5/2004 | Goldberg |
| 6,744,856 B2 | 6/2004 | Karnik |
| 6,744,858 B1 | 6/2004 | Ryan |
| 6,745,038 B2 | 6/2004 | Callaway, Jr. |
| 6,747,596 B2 | 6/2004 | Orler |
| 6,748,195 B1 | 6/2004 | Phillips |
| 6,751,464 B1 | 6/2004 | Burg |
| 6,756,938 B2 | 6/2004 | Zhao |
| 6,757,544 B2 | 6/2004 | Rangarajan |
| 6,757,545 B2 | 6/2004 | Nowak |
| 6,771,742 B2 | 8/2004 | McCalmont |
| 6,771,971 B2 | 8/2004 | Smith |
| 6,772,340 B1 | 8/2004 | Peinado |
| 6,775,255 B1 | 8/2004 | Roy |
| 6,775,267 B1 | 8/2004 | Kung |
| 6,775,534 B2 | 8/2004 | Lindgren |
| 6,775,655 B1 | 8/2004 | Peinado |
| 6,775,802 B2 | 8/2004 | Gaal |
| 6,778,136 B2 | 8/2004 | Gronemeyer |
| 6,778,885 B2 | 8/2004 | Agashe |
| 6,781,963 B2 | 8/2004 | Crockett |
| 6,788,249 B1 | 9/2004 | Farmer |
| 6,795,444 B1 | 9/2004 | Vo |
| 6,795,699 B1 | 9/2004 | McCraw |
| 6,799,049 B1 | 9/2004 | Zellner |
| 6,799,050 B1 | 9/2004 | Krasner |
| 6,801,159 B2 | 10/2004 | Swope |
| 6,804,524 B1 | 10/2004 | Vandermeijden |
| 6,807,534 B1 | 10/2004 | Erickson |
| 6,810,323 B1 | 10/2004 | Bullock |
| 6,813,264 B2 | 11/2004 | Vassilovski |
| 6,813,560 B2 | 11/2004 | Van Diggelen |
| 6,816,111 B2 | 11/2004 | Krasner |
| 6,816,580 B2 | 11/2004 | Timmins |
| 6,816,710 B2 | 11/2004 | Krasner |
| 6,816,719 B1 | 11/2004 | Heinonen |
| 6,816,734 B2 | 11/2004 | Wong |
| 6,820,269 B2 | 11/2004 | Baucke et al. |
| 6,829,475 B1 | 12/2004 | Lee |
| 6,832,373 B2 | 12/2004 | O'Neill |
| 6,839,020 B2 | 1/2005 | Geier |
| 6,839,021 B2 | 1/2005 | Sheynblat |
| 6,839,417 B2 | 1/2005 | Weisman |
| 6,842,715 B1 | 1/2005 | Gaal |
| 6,847,618 B2 | 1/2005 | Laursen |
| 6,847,822 B1 | 1/2005 | Dennison |
| 6,853,916 B2 | 2/2005 | Fuchs |
| 6,856,282 B2 | 2/2005 | Mauro |
| 6,861,980 B1 | 3/2005 | Rowitch |
| 6,865,171 B1 | 3/2005 | Nilsson |
| 6,865,395 B2 | 3/2005 | Riley |
| 6,867,733 B2 | 3/2005 | Sandhu |
| 6,867,734 B2 | 3/2005 | Voor |
| 6,873,854 B2 | 3/2005 | Crockett |
| 6,876,734 B1 | 4/2005 | Summers |
| 6,882,850 B2 | 4/2005 | McConnell et al. |
| 6,885,874 B2 | 4/2005 | Grube |
| 6,885,940 B2 | 4/2005 | Brodie |
| 6,888,497 B2 | 5/2005 | King |
| 6,888,932 B2 | 5/2005 | Snip |
| 6,895,238 B2 | 5/2005 | Newell |
| 6,895,249 B2 | 5/2005 | Gaal |
| 6,900,758 B1 | 5/2005 | Mann |
| 6,903,684 B1 | 6/2005 | Simic |
| 6,904,029 B2 | 6/2005 | Fors |
| 6,907,224 B2 | 6/2005 | Younis |
| 6,907,238 B2 | 6/2005 | Leung |
| 6,912,230 B1 | 6/2005 | Salkini |
| 6,912,395 B2 | 6/2005 | Benes |
| 6,912,545 B1 | 6/2005 | Lundy |
| 6,915,208 B2 | 7/2005 | Garin |
| 6,917,331 B2 | 7/2005 | Gronemeyer |
| 6,930,634 B2 | 8/2005 | Peng |
| 6,937,187 B2 | 8/2005 | Van Diggelen |
| 6,937,872 B2 | 8/2005 | Krasner |
| 6,940,826 B1 | 9/2005 | Simard |
| 6,940,950 B2 | 9/2005 | Dickinson |
| 6,941,144 B2 | 9/2005 | Stein |
| 6,944,540 B2 | 9/2005 | King |
| 6,947,772 B2 | 9/2005 | Minear |
| 6,950,058 B1 | 9/2005 | Davis |
| 6,957,073 B2 | 10/2005 | Bye |
| 6,961,562 B2 | 11/2005 | Ross |
| 6,963,557 B2 | 11/2005 | Knox |
| 6,965,754 B2 | 11/2005 | King |
| 6,965,767 B2 | 11/2005 | Maggenti |
| 6,968,044 B2 | 11/2005 | Beason |
| 6,970,917 B1 | 11/2005 | Kushwaha |
| 6,973,320 B2 | 12/2005 | Brown |
| 6,975,266 B2 | 12/2005 | Abraham |
| 6,978,453 B2 | 12/2005 | Rao |
| 6,980,816 B2 | 12/2005 | Rohler |
| 6,985,747 B2 | 1/2006 | Chithambaram |
| 6,993,355 B1 | 1/2006 | Pershan |
| 6,996,720 B1 | 2/2006 | DeMello |
| 6,999,782 B2 | 2/2006 | Shaughnessy |
| 7,024,321 B1 | 4/2006 | Deninger |
| 7,024,393 B1 | 4/2006 | Peinado |
| 7,047,411 B1 | 5/2006 | DeMello |
| 7,065,351 B2 | 6/2006 | Carter |
| 7,065,507 B2 | 6/2006 | Mohammed |
| 7,072,667 B2 | 7/2006 | Olrik |
| 7,079,857 B2 | 7/2006 | Maggenti |
| 7,103,018 B1 | 9/2006 | Hansen |
| 7,103,574 B1 | 9/2006 | Peinado |
| 7,106,717 B2 | 9/2006 | Rousseau |
| 7,110,773 B1 | 9/2006 | Wallace |
| 7,136,466 B1 | 11/2006 | Gao |
| 7,136,838 B1 | 11/2006 | Peinado |
| 7,151,946 B2 | 12/2006 | Maggenti |
| 7,174,153 B2 | 2/2007 | Ehlers |
| 7,177,397 B2 | 2/2007 | McCalmont |
| 7,177,398 B2 | 2/2007 | Meer |
| 7,177,399 B2 | 2/2007 | Dawson |
| 7,200,380 B2 | 4/2007 | Havlark |
| 7,209,758 B1 | 4/2007 | Moll et al. |
| 7,209,969 B2 | 4/2007 | Lahti |
| 7,218,940 B2 | 5/2007 | Niemenna |
| 7,221,959 B2 | 5/2007 | Lindquist |
| 7,245,900 B1 | 7/2007 | Lamb |
| 7,246,187 B1 | 7/2007 | Ezra et al. .................. 710/200 |
| 7,260,186 B2 | 8/2007 | Zhu |
| 7,260,384 B2 | 8/2007 | Bales et al. |
| 7,269,428 B1 | 9/2007 | Wallenius |
| 7,302,582 B2 | 11/2007 | Snapp |
| 7,321,773 B2 | 1/2008 | Hines |
| 7,330,899 B2 | 2/2008 | Wong |
| 7,333,480 B1 | 2/2008 | Clarke |
| 7,369,508 B2 | 5/2008 | Parantainen |
| 7,369,530 B2 | 5/2008 | Keagy |
| 7,382,773 B2 | 6/2008 | Schoeneberger |
| 7,392,240 B2 | 6/2008 | Scrifffignano |
| 7,394,896 B2 | 7/2008 | Norton |
| 7,428,571 B2 | 9/2008 | Ichimura |

| | | |
|---|---|---|
| 7,436,785 B1 | 10/2008 | McMullen |
| 7,440,442 B2 | 10/2008 | Grabelsky et al. |
| 7,453,990 B2 | 11/2008 | Welenson |
| 7,573,982 B2 | 8/2009 | Breen |
| 7,602,886 B1 | 10/2009 | Beech |
| 7,623,447 B1 | 11/2009 | Faccin |
| 7,711,094 B1 | 5/2010 | Olshansky |
| 7,764,961 B2 | 7/2010 | Zhu et al. ............... 455/433 |
| 7,783,297 B2 | 8/2010 | Ishii |
| 7,787,611 B1 | 8/2010 | Kotelly et al. ......... 379/265.11 |
| 7,895,263 B1 | 2/2011 | Kirchmeier |
| RE42,927 E | 11/2011 | Want |
| 2001/0011247 A1 | 8/2001 | O'Flaherty |
| 2001/0040886 A1 | 11/2001 | Jimenez |
| 2001/0049274 A1 | 12/2001 | Degraeve |
| 2002/0037735 A1 | 3/2002 | Maggenti |
| 2002/0052214 A1 | 5/2002 | Maggenti |
| 2002/0061760 A1 | 5/2002 | Maggenti |
| 2002/0069529 A1 | 6/2002 | Wieres |
| 2002/0077083 A1 | 6/2002 | Zellner |
| 2002/0077084 A1 | 6/2002 | Zellner |
| 2002/0077118 A1 | 6/2002 | Zellner |
| 2002/0077897 A1 | 6/2002 | Zellner |
| 2002/0085538 A1 | 7/2002 | Leung ................. 370/352 |
| 2002/0086659 A1 | 7/2002 | Lauper |
| 2002/0086676 A1 | 7/2002 | Hendry |
| 2002/0098832 A1 | 7/2002 | Fleischer |
| 2002/0102996 A1 | 8/2002 | Jenkins |
| 2002/0102999 A1 | 8/2002 | Maggenti |
| 2002/0111172 A1 | 8/2002 | DeWolf |
| 2002/0112047 A1 | 8/2002 | Kushwaha |
| 2002/0113797 A1 | 8/2002 | Potter |
| 2002/0118650 A1 | 8/2002 | Jagadeesan |
| 2002/0123327 A1 | 9/2002 | Vataja |
| 2002/0126656 A1 | 9/2002 | Park |
| 2002/0138650 A1 | 9/2002 | Yamamoto |
| 2002/0156732 A1 | 10/2002 | Odjik |
| 2002/0158777 A1 | 10/2002 | Flick |
| 2002/0173317 A1 | 11/2002 | Nykanen |
| 2002/0191595 A1 | 12/2002 | Mar |
| 2003/0009277 A1 | 1/2003 | Fan |
| 2003/0009602 A1 | 1/2003 | Jacobs |
| 2003/0012148 A1 | 1/2003 | Peters |
| 2003/0013449 A1 | 1/2003 | Hose |
| 2003/0016804 A1 | 1/2003 | Sheha |
| 2003/0026245 A1 | 2/2003 | Ejzak |
| 2003/0037163 A1 | 2/2003 | Kitada |
| 2003/0040272 A1 | 2/2003 | Lelievre |
| 2003/0065788 A1 | 4/2003 | Salomaki |
| 2003/0072318 A1 | 4/2003 | Lam |
| 2003/0078064 A1 | 4/2003 | Chan |
| 2003/0081557 A1 | 5/2003 | Mettala |
| 2003/0086422 A1 | 5/2003 | Klinker et al. |
| 2003/0086539 A1 | 5/2003 | McCalmont et al. ............ 379/45 |
| 2003/0100320 A1 | 5/2003 | Ranjan |
| 2003/0101329 A1 | 5/2003 | Lahti |
| 2003/0101341 A1 | 5/2003 | Kettler |
| 2003/0103484 A1 | 6/2003 | Oommen |
| 2003/0108176 A1 | 6/2003 | Kung |
| 2003/0109245 A1 | 6/2003 | McCalmont |
| 2003/0114157 A1 | 6/2003 | Spitz |
| 2003/0119521 A1 | 6/2003 | Tipnis |
| 2003/0119528 A1 | 6/2003 | Pew |
| 2003/0125042 A1 | 7/2003 | Olrik |
| 2003/0137961 A1 | 7/2003 | Tsirtsis |
| 2003/0153340 A1 | 8/2003 | Crockett |
| 2003/0153341 A1 | 8/2003 | Crockett |
| 2003/0153342 A1 | 8/2003 | Crockett |
| 2003/0153343 A1 | 8/2003 | Crockett |
| 2003/0161298 A1 | 8/2003 | Bergman |
| 2003/0186709 A1 | 10/2003 | Rhodes et al. ............. 455/456.1 |
| 2003/0196105 A1 | 10/2003 | Fineburg |
| 2003/0204640 A1 | 10/2003 | Sahineja |
| 2003/0223381 A1 | 12/2003 | Schroderus |
| 2004/0002326 A1 | 1/2004 | Maher |
| 2004/0032485 A1 | 2/2004 | Stephens |
| 2004/0043775 A1 | 3/2004 | Kennedy |
| 2004/0044623 A1 | 3/2004 | Wake |
| 2004/0047461 A1 | 3/2004 | Weisman |
| 2004/0068724 A1 | 4/2004 | Gardner |
| 2004/0076277 A1 | 4/2004 | Kuusinen |
| 2004/0078694 A1 | 4/2004 | Lester |
| 2004/0092250 A1 | 5/2004 | Valloppillil |
| 2004/0093217 A1 | 5/2004 | Yeh |
| 2004/0098497 A1 | 5/2004 | Banet |
| 2004/0132465 A1 | 7/2004 | Mattila |
| 2004/0181689 A1 | 9/2004 | Kiyoto |
| 2004/0184584 A1 | 9/2004 | McCalmont |
| 2004/0185875 A1 | 9/2004 | Diacakis |
| 2004/0190497 A1 | 9/2004 | Knox |
| 2004/0192271 A1 | 9/2004 | Eisner et al. ............... 455/414.1 |
| 2004/0198332 A1 | 10/2004 | Lundsgaard |
| 2004/0198386 A1 | 10/2004 | Dupray |
| 2004/0203922 A1 | 10/2004 | Hines |
| 2004/0205151 A1 | 10/2004 | Sprigg |
| 2004/0229632 A1 | 11/2004 | Flynn |
| 2004/0235493 A1 | 11/2004 | Ekerborn |
| 2004/0242238 A1 | 12/2004 | Wang |
| 2004/0267445 A1 | 12/2004 | De Luca |
| 2005/0028034 A1 | 2/2005 | Gantman |
| 2005/0031095 A1 | 2/2005 | Pietrowicz |
| 2005/0039178 A1 | 2/2005 | Marolia |
| 2005/0041578 A1 | 2/2005 | Huotari |
| 2005/0043037 A1 | 2/2005 | Loppe |
| 2005/0053209 A1 | 3/2005 | D'Evelyn |
| 2005/0063519 A1 | 3/2005 | James |
| 2005/0071671 A1 | 3/2005 | Karaoguz |
| 2005/0078612 A1 | 4/2005 | Lang |
| 2005/0083911 A1 | 4/2005 | Grabelsky |
| 2005/0086467 A1 | 4/2005 | Asokan |
| 2005/0090236 A1 | 4/2005 | Schwinke |
| 2005/0101335 A1 | 5/2005 | Kelly |
| 2005/0107673 A1 | 5/2005 | Ball |
| 2005/0112030 A1 | 5/2005 | Gaus |
| 2005/0119012 A1 | 6/2005 | Merheb |
| 2005/0134504 A1 | 6/2005 | Harwood |
| 2005/0135569 A1 | 6/2005 | Dickinson |
| 2005/0136885 A1 | 6/2005 | Kaltsukis |
| 2005/0149430 A1 | 7/2005 | Williams |
| 2005/0169248 A1 | 8/2005 | Truesdale |
| 2005/0174991 A1 | 8/2005 | Keagy |
| 2005/0192822 A1 | 9/2005 | Hartenstein |
| 2005/0201529 A1 | 9/2005 | Nelson |
| 2005/0209995 A1 | 9/2005 | Aksu |
| 2005/0213716 A1 | 9/2005 | Zhu |
| 2005/0232252 A1 | 10/2005 | Hoover |
| 2005/0250516 A1 | 11/2005 | Shim |
| 2005/0259675 A1 | 11/2005 | Tuohino |
| 2005/0265318 A1 | 12/2005 | Khartabil |
| 2005/0271029 A1 | 12/2005 | Iffland |
| 2005/0282518 A1 | 12/2005 | D'Evelyn |
| 2005/0287979 A1 | 12/2005 | Rollender |
| 2005/0289097 A1 | 12/2005 | Trossen |
| 2006/0008065 A1 | 1/2006 | Longman et al. |
| 2006/0023747 A1 | 2/2006 | Koren et al. |
| 2006/0026288 A1 | 2/2006 | Acharya |
| 2006/0036680 A1 | 2/2006 | Shim |
| 2006/0053225 A1 | 3/2006 | Poikselka |
| 2006/0058042 A1 | 3/2006 | Shim |
| 2006/0058102 A1 | 3/2006 | Nguyen et al. |
| 2006/0068753 A1 | 3/2006 | Karpen |
| 2006/0077911 A1 | 4/2006 | Shaffer |
| 2006/0078094 A1 | 4/2006 | Breen et al. ................ 379/45 |
| 2006/0079249 A1 | 4/2006 | Shim |
| 2006/0088152 A1 | 4/2006 | Green |
| 2006/0120517 A1 | 6/2006 | Moon |
| 2006/0128395 A1 | 6/2006 | Muhonen |
| 2006/0135177 A1 | 6/2006 | Winterbottom |
| 2006/0188083 A1 | 8/2006 | Breen |
| 2006/0193447 A1 | 8/2006 | Schwartz |
| 2006/0212558 A1 | 9/2006 | Sahinoja |
| 2006/0212562 A1 | 9/2006 | Kushwaha |
| 2006/0225090 A1 | 10/2006 | Shim et al. |
| 2006/0234639 A1 | 10/2006 | Kushwaha |
| 2006/0234698 A1 | 10/2006 | Fok |
| 2006/0239205 A1 | 10/2006 | Warren |
| 2006/0250987 A1 | 11/2006 | White |
| 2006/0258380 A1 | 11/2006 | Liebowitz |

| | | |
|---|---|---|
| 2006/0281437 A1 | 12/2006 | Cook |
| 2006/0293024 A1 | 12/2006 | Benco |
| 2006/0293066 A1 | 12/2006 | Edge |
| 2007/0003024 A1 | 1/2007 | Olivier |
| 2007/0019614 A1 | 1/2007 | Hoffmann |
| 2007/0022011 A1 | 1/2007 | Altberg |
| 2007/0026854 A1 | 2/2007 | Nath |
| 2007/0026871 A1 | 2/2007 | Wager |
| 2007/0027997 A1 | 2/2007 | Polk |
| 2007/0030539 A1 | 2/2007 | Nath |
| 2007/0036139 A1 | 2/2007 | Patel |
| 2007/0037585 A1 | 2/2007 | Shim |
| 2007/0041513 A1 | 2/2007 | Gende |
| 2007/0049288 A1 | 3/2007 | Lamprecht |
| 2007/0072624 A1 | 3/2007 | Niemaenmaa |
| 2007/0081635 A1 | 4/2007 | Croak |
| 2007/0082681 A1 | 4/2007 | Kim |
| 2007/0082682 A1 | 4/2007 | Kim |
| 2007/0115941 A1 | 5/2007 | Patel |
| 2007/0121601 A1 | 5/2007 | Kikinis |
| 2007/0149213 A1 | 6/2007 | Lamba |
| 2007/0160036 A1 | 7/2007 | Smith |
| 2007/0162228 A1 | 7/2007 | Mitchell |
| 2007/0167177 A1 | 7/2007 | Kraufvelin |
| 2007/0182547 A1 | 8/2007 | Wachter |
| 2007/0206568 A1 | 9/2007 | Silver |
| 2007/0206613 A1 | 9/2007 | Silver |
| 2007/0242660 A1 | 10/2007 | Xu |
| 2007/0243885 A1 | 10/2007 | Shim |
| 2007/0263610 A1 | 11/2007 | Mitchell |
| 2007/0270164 A1 | 11/2007 | Maier |
| 2008/0037715 A1 | 2/2008 | Prozeniuk |
| 2008/0045250 A1 | 2/2008 | Hwang |
| 2008/0063153 A1 | 3/2008 | Krivorot |
| 2008/0065775 A1 | 3/2008 | Polk |
| 2008/0109650 A1 | 5/2008 | Shim |
| 2008/0117859 A1 | 5/2008 | Shahidi |
| 2008/0186164 A1 | 8/2008 | Emigh |
| 2008/0214202 A1 | 9/2008 | Toomey |

FOREIGN PATENT DOCUMENTS

| | | |
|---|---|---|
| WO | PCTUS9928848 | 12/1999 |
| WO | WO01/45342 | 6/2001 |
| WO | PCTUS0146666 | 11/2001 |
| WO | WO2004/025941 | 3/2004 |
| WO | PCT/US05/022090 | 6/2005 |
| WO | WO2005/051033 | 6/2005 |
| WO | WO/2006/075856 | 7/2006 |

OTHER PUBLICATIONS

International Search Report in PCT/US2007/23243 dated Apr. 2, 2008.

PCT International Search Report (PCTUS2007/23714) and Written Opinion of International Searching Authority, Apr. 18, 2008.

Le-Pond Chin, Jyh-Hong Wen, Ting-Way Liu, The Study of the Interconnection of GSM Mobile Communication System Over IP based Network, May 6, 2001, IEEE, Vehicular Technology Conference, vol. 3, pp. 2219-2223.

Location Based Services V2 Roaming Support (non proprietary), 80-V8470-2NP A, dated Jan. 27, 2005, pp. 1-56.

Yilin Ahao, Efficient and reliable date transmission for cellular and GPS based mayday systems, Nov. 1997, IEEE, IEEE Conference on Intelligent Transportation System, 1997. ITSC 97, 555-559.

Qualcomm CDMA Technologies, LBS Control Plane/User Plane Overview—80-VD378-1NP B, 2006, pp. 1-36.

Bhalla et al, TELUS, Technology Strategy—LBS Roaming Summit, Sep. 19, 2006.

Alfredo Aguirre, Ilusacell, First and Only Carrier in Mexico with a 3G CDMA Network, 2007.

Mike McMullen, Sprint, LBS Roaming Summit, Sep. 19, 2006.

Andrew Yeow, BCE, LBS Roaming Summit, Sep. 19, 2006, pp. 1-8.

Nars Haran, U.S. Cellular, Packet Data—Roaming and LBS Overview, Nov. 2, 2007, pp. 1-15.

Qualcomm CDMA Technologies, LBS Control Plane Roaming—80-VD377-1NP A, 2006, pp. 1-10.

Qualcomm CDMA Technologies, MS Resident User Plane LBS Roaming—80-VC718-1 E, 2006, pp. 1-37.

Intrado MSAG Prep for E911 Program and Documentation. Intrado Inc., Longmont, CO. Sep. 14, 2006. Accessed: Nov. 8, 2011. Idaho PSAP Standards Committee. Idaho Emergency Communications Commission,http://idahodispatch.com/index.php?option=com_documan&task=doc_download&gid=3&Itemid=7.

* cited by examiner

US 8,190,151 B2

ROAMING GATEWAY ENABLING LOCATION BASED SERVICES (LBS) ROAMING FOR USER PLANE IN CDMA NETWORKS WITHOUT REQUIRING USE OF A MOBILE POSITIONING CENTER (MPC)

This application is a continuation of U.S. patent application Ser. No. 11/979,493, filed on Nov. 5, 2007 now U.S. Pat. No. 7,966,013, entitled "Roaming Gateway Enabling Location Based Services (LBS) Roaming for User Plane in CDMA Networks Without Requiring Use of Mobile Positioning Center (MPC)", which claims priority from U.S. Provisional Application No. 60/856,285, filed on Nov. 3, 2006, entitled "Roaming Gateway Enabling Location Based Services (LBS) Roaming for User Plane in CDMA Networks Without Requiring Use of Mobile Positioning Center (MPC)", the entirety of both of which are incorporated herein by reference.

BACKGROUND OF THE INVENTION

1. Field of the Invention

This invention pertains to wireless services, and more particularly to wireless location based services roaming particularly in a CDMA wireless network.

2. Background of Related Art

Location based services (LBS) refer to a broad range of services that are based on (or enhanced by) information about the physical location of a user and/or device. Typical location-based services for consumers might include real-time turn-by-turn directions, the location of the nearest gas station or motel, or social networking services. What makes the service location-based is that it knows your location automatically, without entering a street address, for example.

Location based services are typically made available to a user via a WAP site, or downloadable software (e.g., Java, BREW, Symbian, etc.) They can also be made available in some cases via voice or text messaging. Some location-based services report location to a third party, such as parents tracking the location of children, or businesses tracking a fleet of vehicles.

Location based services exploit knowledge about where an information device user is located. For example, the user of a wireless-connected smartphone could be shown advertisements specific to the region that a wireless user is traveling in.

U.S. Pat. No. 7,209,758 to Moll et al. (Moll) discloses a method and system for sharing and centralizing mobile positioning information and geospatial data for roaming mobile subscriber terminals, the entirety of which is expressly incorporated herein by reference. Moll shows, e.g., in FIG. 6 of U.S. Pat. No. 7,209,758, typical conventional call flow for serving a location based service (LBS).

FIG. 6 of Moll, copied herein as prior art FIG. 3, is a call flow diagram illustrating a call flow 600 for serving an LBS in a system. After registration in the serving network 406, a user of a mobile subscriber terminal (MST) 404 may initiate a request for an LBS from an LBS provider 410. To do so, the user of the MST 404 may enter digits or characters into the MST 404 and then press a "Talk" or "Send" key or select a wireless web LBS application that initiates a request for an LBS.

The dialed digits and/or characters may be sent to a serving-network gateway 440 as a first request message 601 that may be, for example, formatted according to IS-2000 and/or IS-95. As such, the first request message 601 may contain information identifying the serving network 406 that is normally sent, for example, as part of an IS-2000 and/or IS-95 message (e.g., the MSCID, SYSID and NETID parameters).

After receipt of the first request message 601, the serving-network gateway 440 parses the information identifying the serving network 406 (hereinafter referred to as a "carrier-ID") from the first request message 601 so as to preserve the carrier-ID, which will change if the first request message 601 traverses from the serving network 406 to the subscriber network 412. The serving-network gateway 440 then couples (e.g., inserts, appends, integrates into, commingles, encapsulates, or otherwise associates) the carrier-ID to the request for an LBS and then places the combination in a second request message 603. Thereafter, the serving-network gateway 440 sends the second request message 603 to the LBS provider 410.

After receiving the second request message, the LBS provider 410 may parse the carrier-ID from the request for the LBS contained in the second request message 603. The LBS provider 410 may then use the carrier-ID to address or otherwise direct to the serving-network gateway 440 a network-initiated-request message 605 to obtain the mobile-position information associated with the MST 404. Thereafter, the LBS provider 410 may send the network-initiated-request message 605 back to the serving-network gateway 440.

The serving-network gateway 440 handles the call processing for the network-initiated-request message 605, and initiates a process to send a first Origination Request message (ORREQ) 607 to the STP 424. The STP 424 selects the SCP 426 and forwards to it a second ORREQ message 609.

The second ORREQ message 609 may contain an indication that the destination for the second ORREQ message 609 is a router process on the MPC 454. Also contained in the ORREQ message 609 are numerous parameters, preferably including the telephone number of the MST 404, the ESN of the MST 404, the granularity of mobile positioning information that is authorized, the frequency and band class of the serving base station, and the base station's Cell ID and Sector ID. The SCP 426 may glean some or all of this information from the HLR 450 and/or VLR 428.

Based on the destination indication within the second ORREQ message 609, the SCP 426 sends to the MPP 455 running on the MPC 454 a third ORREQ message 611 containing the parameters in the second ORREQ message 409. The MPP 455 may then compare the carrier-ID against an internal table or list to determine if the serving network 406 is authorized to provide location based services to the mobile subscriber terminal 404. The comparison may be carried out to determine whether the serving network 406 has partnered with the subscriber network 412 as well as privacy purposes.

Once authorization is given, the MPP 455 may responsively query the serving-network location platform 452 by way of a Transaction Capabilities message (TCAP) 613. The MPP 455 may also provide the location platform 452 with the Cell ID and Sector ID of the BTS 420. The location platform 452 may then send a first query message 615 to the LI database 430 for the MSCID, Cell ID and Sector ID to obtain a cell-sector's centroid, which may be a relative center of the coverage of a cell sector. Responsive to the first query message 615, the LI database 430 returns the requested information in a first query_rr message 617.

If the location granularity for the request is authorized for only cell sector centroid, then the location platform 452 responds to the MPP 455 using a second TCAP message 619, the content of which may include the cell-sector's centroid. The MPP 455 then responds to the third ORREQ message 611 with an ORREQ Return Result (orreq_rr) message 621, which in turn contains the cell-sector's centroid. This information is passed back to the serving-network gateway 440, which then sends to the LBS provider 410 a response to the network-initiated-request message in the form of a network-initiated-request return result (nir_rr) message 623, which contains the information from the orreq_rr message 621.

After the LBS provider 410 obtains the cell-sector's centroid from the nir_rr message 623, it may issue a second query message 625 to the GIS data store 480 to obtain geocode data corresponding to the cell-sector's centroid. Responsive to the second query 625, the GIS data store 480 returns to the LBS provider 410 a query return result (query_rr) message 627 containing the geocode information. Using the cell-sector's centroid received from the location platform 452 and the geocode, the LBS provider 410 formulates a response to the request for the LBS. Thereafter, the LBS provider 410 sends to the MST 404 via the serving-network-gateway 440 a request_rr message 629 containing the response to the request for the LBS.

FIG. 7 of Moll, copied herein as prior art FIG. 4, is a call flow diagram illustrating a call flow 700 for serving detailed mobile positioning information to the MST 404 in a system. The call flow 700 shown in FIG. 4 is similar to the call flow 600 shown in FIG. 6, except as described herein. Included in FIG. 4 is the position determining equipment (PDE) 456 for the serving network 406. As described in the J-STD-036 standard, the MPC 454 may use the PDE 456 to provide more granular mobile positioning information than the can be provide by MPC 454 alone. Thus, if authorized for detailed mobile positioning information for the MST 404 and if the MST 404 is compatible with the PDE 456, then the MPC 454 may use the PDE 456 to obtain the detailed mobile positioning information.

Referring now to FIG. 4 at call flow element 701, the MPC 454 may initiate a communication, e.g., an IS-801-A communication 703, between the MST 404 and the PDE 456 (assuming the MST 404 is compatible with the PDE 456) to obtain mobile positioning information about the MST 404. Details of the IS-801-A standard may be found in the TIA/EIA/IS-801-A standard, which was published by Telecommunications Industry Association, on Apr. 7, 2004, and which is fully incorporated herein by reference.

The PDE 456 may receive mobile positioning information from the MST 404 itself. To determine its position, however, the PDE 456 may provide to the MST 404 some baseline navigational information to enable the MST 404 to roughly establish its position. The MST 404 may then use a terrestrial positioning system, a celestial positioning system, or a combination of these systems to establish its position. Terrestrial positioning systems utilize various techniques, such as forward link trilaterization ("FLT"), advanced forward link trilaterization ("AFLT"), amplitude difference, angle of arrival ("AD-AOA"), and enhanced observed time difference ("EOTD") to generate mobile positioning information. GPS is an example of a celestial positioning system.

In response to the baseline navigational information, the MST 404 may return to the PDE 456 more precise navigational information including, for example, GPS coordinates and/or pseudo range information as defined by IS-801-A, and/or pseudorandom noise (PN) code offset measurements as defined by IS-801-A. If not already supplied in latitude, longitude, bearing, etc, the PDE 456 may then perform signal processing on the data retrieved from the MST 404 to generate mobile positioning information in this format. The PDE 456 may then forward this navigational information to the location platform 452 in a J-STD-036 message 705. The location platform 452 may then send the second TCAP 619 as described above. The second TCAP 619 contains the navigational information provided by the PDE 456.

Alternatively, the location platform 452 may send the navigational information to a Wireless Automatic Location Information (WALI) process as defined in J-STD-036 standard. The WALI process may send the navigational information to the Location Information (LI) database 430 for transmission to the MPC 454. In another alternatively, the location platform may place the navigational information in a pull table (not shown), where the MPC 454 or other entity, such as the LBSP 410, can retrieve it.

Currently the only support for location based services (LBS) roaming is defined via the use of Mobile Position Centers (MPCs) in Qualcomm recommended standards. For instance, current roaming support is defined in the CDMA standards as being supported by mobile position center (MPC) to MPC architecture and communications. However, not many CDMA networks have a working implementation of this standard.

SUMMARY OF THE INVENTION

A method and apparatus for facilitating location based services (LBS) to a roaming mobile device in accordance with the principles of the present invention comprises receiving IS-801 session data containing a message originated by an interrogating mobile device in a first carrier network to a routing LBS gateway. The IS-801 session data is routed to a correct visited carrier network position determining entity (PDE) that contains the correct base station almanac (BSA) data. The obtained correct assistance data is returned to the interrogating mobile device. Accordingly, LBS roaming is facilitated between CDMA network carriers that use a PDE and not an mobile positioning center (MPC) to provide assistance data to a mobile device.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

The present invention provides solutions to support location based services (LBS) to CDMA mobiles while roaming on another network. IS-801 session data is routed by a routing gateway to a correct visited network position determining equipment (PDE) that contains correct base station almanac (BSA) data used to determine assistance data, which is then returned to an interrogating mobile device. A standalone roaming LBS routing gateway (XRG) provides network connectivity between PDE equipment in multiple carrier networks.

In particular, in accordance with the principles of the present invention, a routing gateway inspects IS-801 session data to determine the identity of the visited network, and the identity of the original home network of the CDMA mobile that initiates the given IS-801 session. The routing gateway then routes the session to the correct visited network position determining equipment (PDE) to obtain the correct assistance data, which is then returned to the interrogating mobile.

Conventionally, location based services (LBS) roaming support is defined via the use of Mobile Position Centers (MPCs), e.g., See Qualcomm recommended standards. The inventive architecture and method implements a roaming LBS gateway to enable roaming between CDMA carriers that are only using a PDE (Positioning Determining Entity) for this purpose, since a mobile position center (MPC) is typically an optional network node according to location based services (LBS) specifications.

The roaming gateway takes IS-801 position determination data messages from a mobile sent over Internet protocol (IP). The roaming gateway inspects the information contained in the IS-801 message that identifies the originating network of the CDMA subscriber, namely the system ID (SID) and network ID (NID) that can determine which network the customer is visiting. Using this information the roaming gateway routes the IS-801 session to the visited network position determining equipment (PDE) based on a table of the relevant network's position determining equipment (PDE) Internet protocol (IP) address and port number to establish the TCP/IP connection.

Figure 1:
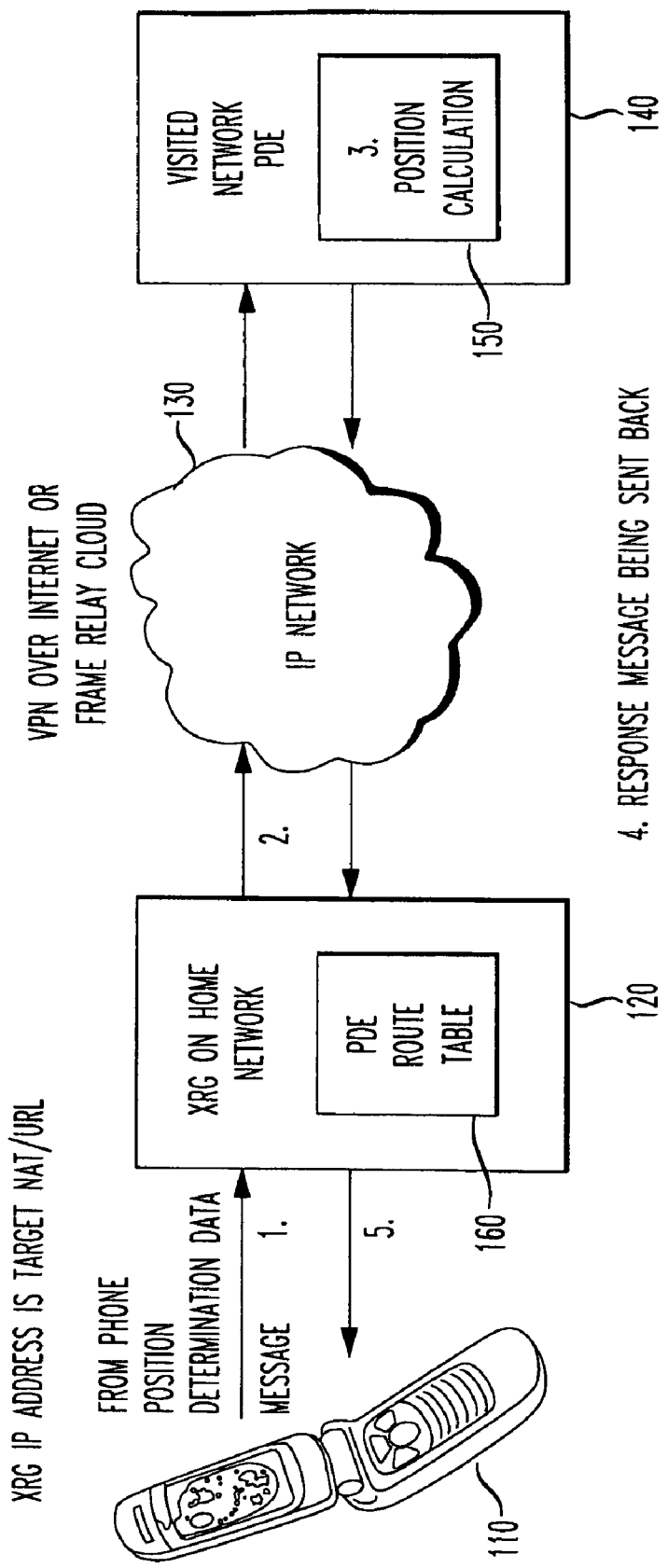
FIG. 1 shows exemplary roaming LBS routing gateway (XRG) call flow for a roaming location based services (LBS) request, in accordance with the principles of the present invention.

FIG. 1 shows exemplary roaming LBS routing gateway (XRG) call flow for a roaming location based services (LBS) request, in accordance with the principles of the present invention.

In particular, FIG. 1 shows exemplary call flow between a mobile device 110, a roaming gateway 120 on the mobile device's home network, an Internet Protocol (IP) network 130 (e.g., the Internet), and a visited network PDE 140, without requiring call flow via a mobile positioning center (MPC). The exemplary roaming LBS routing gateway (XRG) on the home network 120 preferably includes a suitable PDE route table 160. The visited network PDE 140 includes a suitable position calculation module 150.

Steps 1 to 5 show exemplary call flow for a LBS request from a roaming mobile device 110.

In particular, as shown in step 1 of FIG. 1, the mobile device (MS) 110 includes a global positioning system (GPS) chip (e.g., GPSOne chip). The mobile device 110 establishes an IS-801 session, and sends a position determination data message on Internet protocol (IP) user plane. The target IP address of this position determination data message is the exemplary roaming LBS routing gateway (XRG) 120 on the home network, so that the XRG 120 receives the transmitted position determination message.

In step 2, the roaming LBS routing gateway XRG 120 opens up the received IS-801 message to determine the base ID, system ID, and network ID: If determined to be a roamer route to visited network PDE 140.

The roaming LBS routing gateway XRG 120 dips into a position determining equipment (PDE) route table 160 to determine the PDE IP address and port information. Note that this assumes that the visited partner network opens the position determining equipment (PDE) to this connection.

In step 3, the visited network position determining equipment (PDE) 140 receives the IS-801 message, performs a calculation using a BSA data and satellite reference feed, provides assistance data, and returns a position calculation.

In step 4, the position determination response is sent back to the XRG 120.

In step 5, the XRG 120 sends the IS-801 message including the position determination response back to the requesting mobile station (MS) 110.

Figure 2:
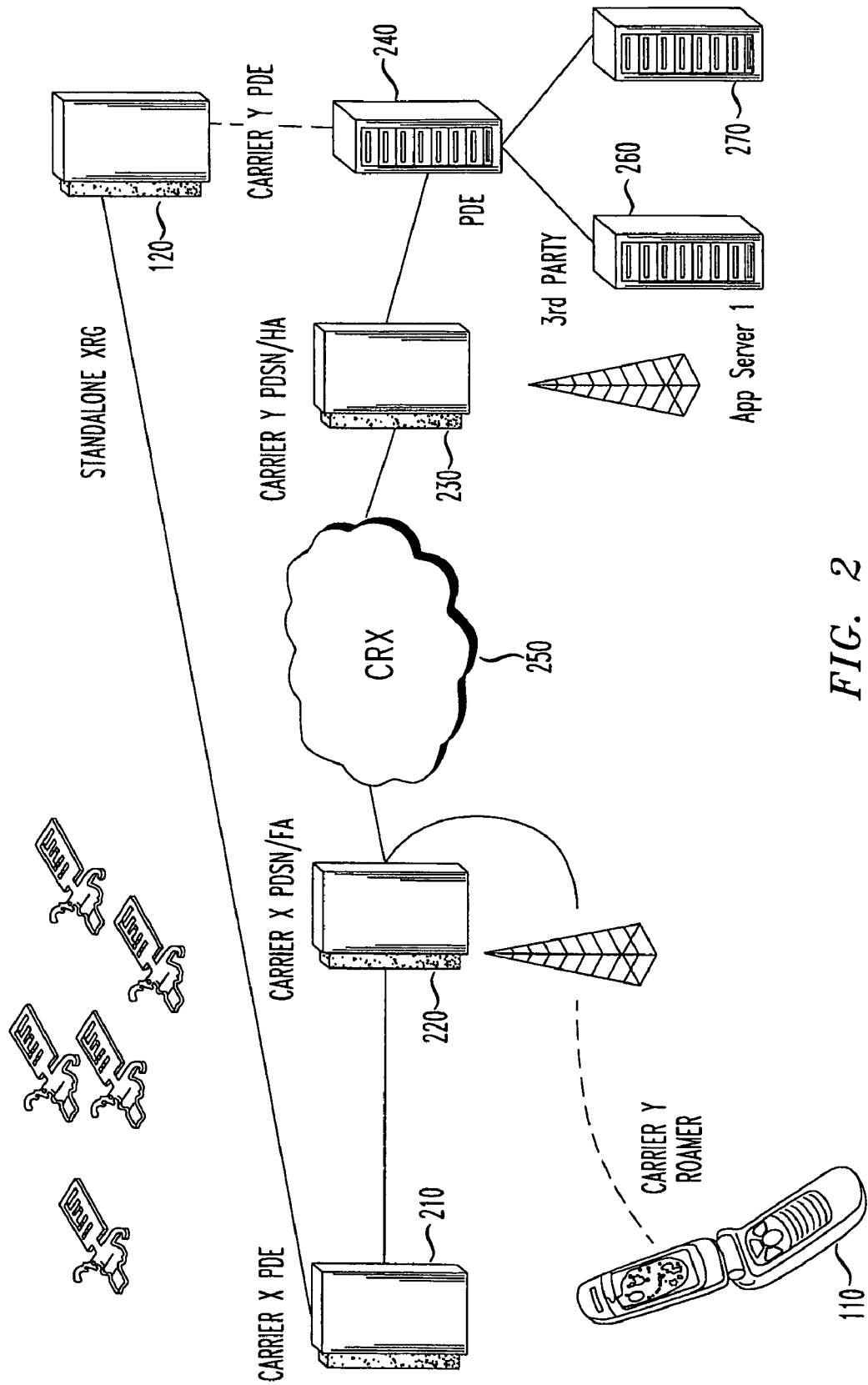
FIG. 2 shows an exemplary diagram of network connectivity, in accordance with the principles of the present invention.
Figure 3:
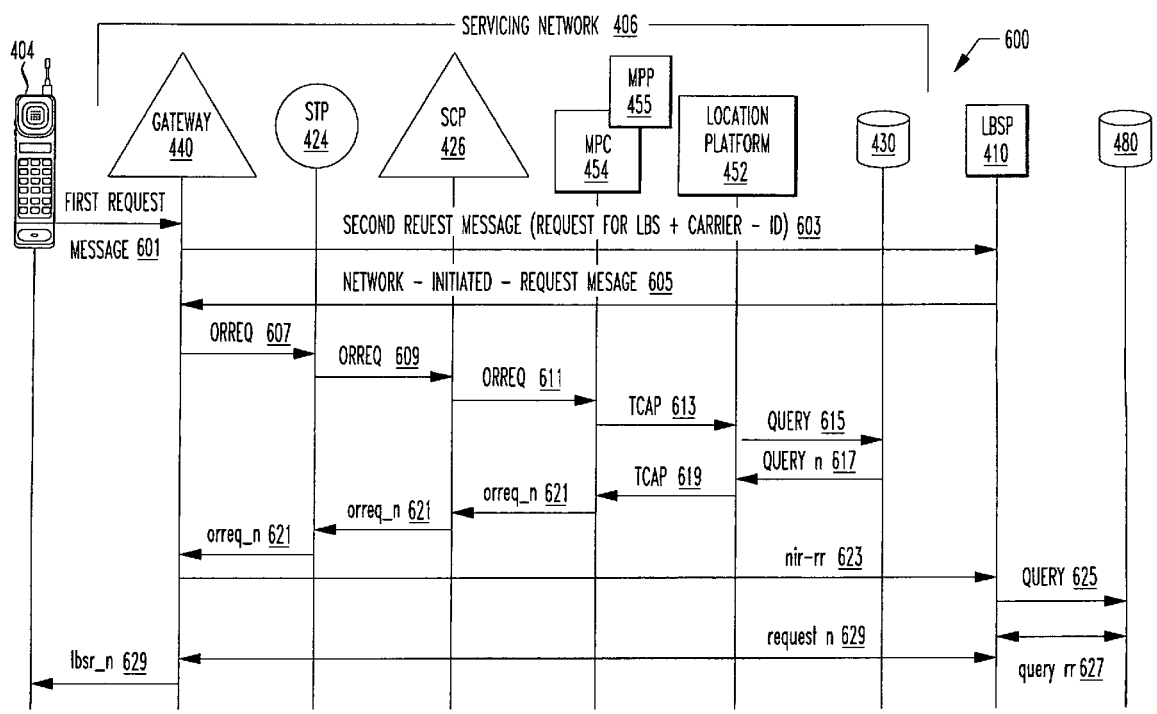
FIG. 3 shows a first call flow diagram illustrating a conventional call flow for serving LBSs to a mobile subscriber terminal when roaming in a coverage area of a serving network.
Figure 4:
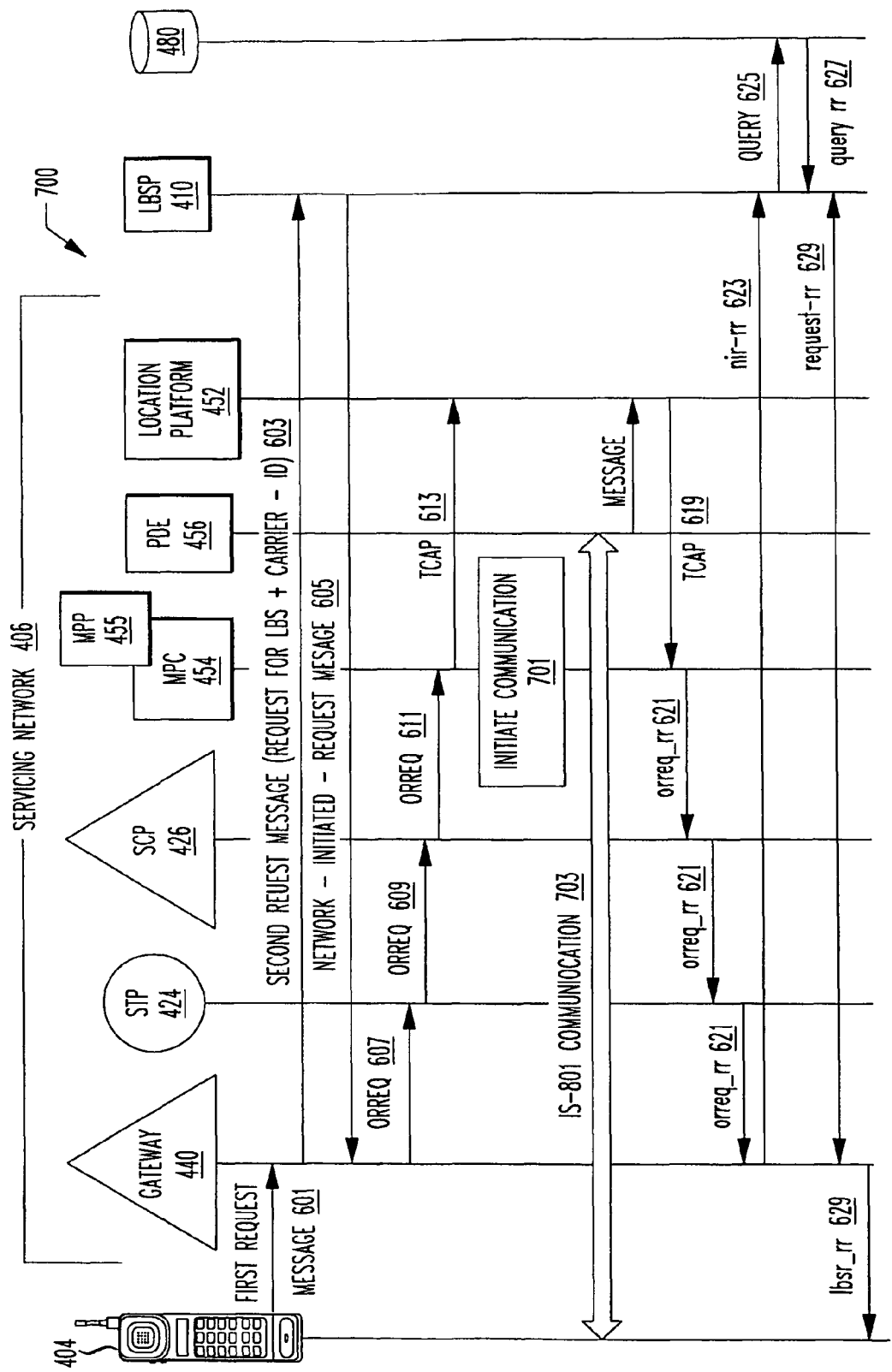
FIG. 4 shows a second call flow diagram of a conventional system for providing location based services to a mobile subscriber terminal roaming outside a coverage area of a location based service provider and inside a coverage area of a serving network.

FIG. 2 shows an exemplary diagram of network connectivity between a standalone roaming gateway 120 and carrier position determining equipment, in accordance with the principles of the present invention.

In particular, the network diagram of FIG. 2 illustrates the use of a roaming LBS routing gateway (XRG) 120 to support location request roaming between carrier networks including respective PDE equipment 210, 240.

The roaming LBS routing gateway XRG 120 communicates on a User Plane with carrier X PDE 210 as described with respect to FIG. 1, as well as with carrier Y PDE 240.

The methodology and architecture shown in FIGS. 1 and 2 work in most cases even if the other visited network is a trusted or non-trusted network (as defined by CDG specifications for V1 and v2 Location based services).

The invention has particular applicability to user's of mobile devices including a LBS application, e.g., a fleet of people driving ground transportation vehicles.

While the invention has been described with reference to the exemplary embodiments thereof, those skilled in the art will be able to make various modifications to the described embodiments of the invention without departing from the true spirit and scope of the invention.

What is claimed is:

1. A method of facilitating location based services (LBS) for a roaming mobile device, comprising:
    receiving IS-801 session data, at a physical LBS routing gateway, from a physical roaming mobile device in a visited carrier network;
    determining an address of a visited carrier network positioning entity (PDE) containing position information associated with said physical roaming mobile device;
    routing said IS-801 session data to said visited carrier network PDE containing position information associated with said physical roaming mobile device; and
    transmitting said position information to an interrogating device;
    wherein LBS roaming is facilitated between network carriers using said visited carrier network PDE that is distinct from an mobile positioning center (MPC) to provide said position information to said interrogating device; and
    wherein said physical LBS routing gateway is located outside of said visited carrier network and a home carrier network.

2. The method of facilitating location based services (LBS) for a roaming mobile device according to claim 1, wherein said received IS-801 session data determines:
    an identity of said visited carrier network; and
    an identity of a home network associated with said physical roaming mobile device.

3. The method of facilitating location based services (LBS) for a roaming mobile device according to claim 2, wherein:
    said identity of said visited carrier network includes a system ID (SID) and a network ID (NID).

4. The method of facilitating location based services (LBS) for a roaming mobile device according to claim 1, wherein:
    said mobile device is a CDMA device.

5. The method of facilitating location based services (LBS) for a roaming mobile device according to claim 1, wherein:
said physical LBS routing gateway is located outside of said visited carrier network.

6. The method of facilitating location based services (LBS) for a roaming mobile device according to claim 1, wherein:
said physical LBS routing gateway is located outside of a home carrier network.

7. A method of facilitating location based services (LBS) for a roaming mobile device, comprising:
receiving IS-801 session data, at a physical LBS routing gateway, from a physical roaming mobile device in a visited carrier network;
determining an address of a visited carrier network positioning entity (PDE) containing position information associated with said physical roaming mobile device;
routing said IS-801 session data to said visited carrier network PDE containing position information associated with said physical roaming mobile device;
transmitting said position information to an interrogating device;
querying a PDE route table to determine an Internet protocol (IP) address and port number of said visited carrier network PDE; and
establishing a TCP/IP connection between said physical LBS routing gateway and said visited carrier network PDE;
wherein LBS roaming is facilitated between network carriers using said visited carrier network PDE that is distinct from an mobile positioning center (MPC) to provide said position information to said interrogating device.

* * * * *